United States Patent
Kloper et al.

(10) Patent No.: US 9,241,275 B2
(45) Date of Patent: Jan. 19, 2016

(54) DISTRIBUTED PROCESSING DISTRIBUTED-INPUT DISTRIBUTED-OUTPUT (DIDO) WIRELESS COMMUNICATION

(71) Applicant: Cisco Technology, Inc., San Jose, CA (US)

(72) Inventors: David Kloper, Santa Clara, CA (US); Brian D. Hart, Sunnyvale, CA (US); Paul J. Stager, Akron, OH (US); Matthew A. Silverman, Shaker Heights, OH (US)

(73) Assignee: Cisco Technologies, Inc., San Jose, CA (US)

( * ) Notice: Subject to any disclaimer, the term of this patent is extended or adjusted under 35 U.S.C. 154(b) by 399 days.

(21) Appl. No.: 13/780,513

(22) Filed: Feb. 28, 2013

(65) Prior Publication Data

US 2014/0241240 A1    Aug. 28, 2014

(51) Int. Cl.
*H04W 16/28* (2009.01)
*H04B 7/02* (2006.01)

(52) U.S. Cl.
CPC .............. *H04W 16/28* (2013.01); *H04B 7/024* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 5,425,000 A * | 6/1995 | Reed ........................ | G01S 7/529 367/119 |
| 7,945,005 B2 * | 5/2011 | Le Saux .............. | H04L 25/0204 375/347 |
| 8,842,606 B2 * | 9/2014 | Denteneer ............. | H04L 5/0023 370/328 |
| 2008/0080631 A1 | 4/2008 | Forenza et al. | |
| 2008/0118004 A1 | 5/2008 | Forenza et al. | |
| 2008/0130790 A1 | 6/2008 | Forenza et al. | |
| 2009/0067402 A1 | 3/2009 | Forenza et al. | |
| 2010/0172309 A1 | 7/2010 | Forenza et al. | |
| 2010/0316163 A1 | 12/2010 | Forenza et al. | |
| 2011/0002371 A1 | 1/2011 | Forenza et al. | |
| 2011/0002410 A1 | 1/2011 | Forenza et al. | |
| 2011/0002411 A1 | 1/2011 | Forenza et al. | |
| 2011/0003606 A1 | 1/2011 | Forenza et al. | |
| 2011/0003607 A1 | 1/2011 | Forenza et al. | |

(Continued)

OTHER PUBLICATIONS

Balan, et al., "AirSync: Enabling Distributed Multiuser MIMO with Full Spatial Multiplexing," IEEE/ACM Transactions on Networking, Jul. 2012, pp. 1-15.

(Continued)

*Primary Examiner* — Steve Young
(74) *Attorney, Agent, or Firm* — Edell, Shapiro & Finnan, LLC

(57) ABSTRACT

Techniques are presented for distributed processing Distributed-Input Distributed-Output (DIDO) wireless communication. A plurality of base stations (e.g., APs) are provided, each configured to wirelessly serve one or more wireless devices (e.g., clients). At least first and second base stations are configured to transmit simultaneously at an agreed upon time. The first and second base stations are each configured to locally generate steering matrix information used to spatially precode their respective data transmissions in order to steer their respective data transmissions to their one or more wireless devices while nulling to the one or more client devices of the other base station. Moreover, the first and second base stations are each configured to locally generate a transmit waveform by applying the steering matrix information to their respective data transmissions.

20 Claims, 9 Drawing Sheets

(56) References Cited

U.S. PATENT DOCUMENTS

| | | |
|---|---|---|
| 2011/0003608 A1 | 1/2011 | Forenza et al. |
| 2011/0044193 A1* | 2/2011 | Forenza et al. ............... 370/252 |
| 2011/0149882 A1* | 6/2011 | Gong et al. ................... 370/329 |
| 2011/0222460 A1* | 9/2011 | Fahldieck ..................... 370/312 |
| 2012/0087430 A1 | 4/2012 | Forenza et al. |
| 2012/0093078 A1 | 4/2012 | Perlman et al. |
| 2012/0314570 A1 | 12/2012 | Forenza et al. |
| 2013/0034130 A1 | 2/2013 | Forenza et al. |
| 2013/0039168 A1 | 2/2013 | Forenza et al. |
| 2013/0301471 A1* | 11/2013 | Brown et al. ................. 370/254 |
| 2014/0071955 A1* | 3/2014 | Du et al. ....................... 370/336 |

OTHER PUBLICATIONS

Balan, et al., "Distributed Multiuser MIMO with Full Spatial Multiplexing," Ming Hsieh Institute, Mar. 12, 2012, pp. 1-2.

Murakami, et al., "Performance Evaluation of Distributed Multi-cell Beamforming for MU-MIMO Systems," 8th International Symposium on Wireless Communication Systems, 2011, pp. 547-551.

* cited by examiner

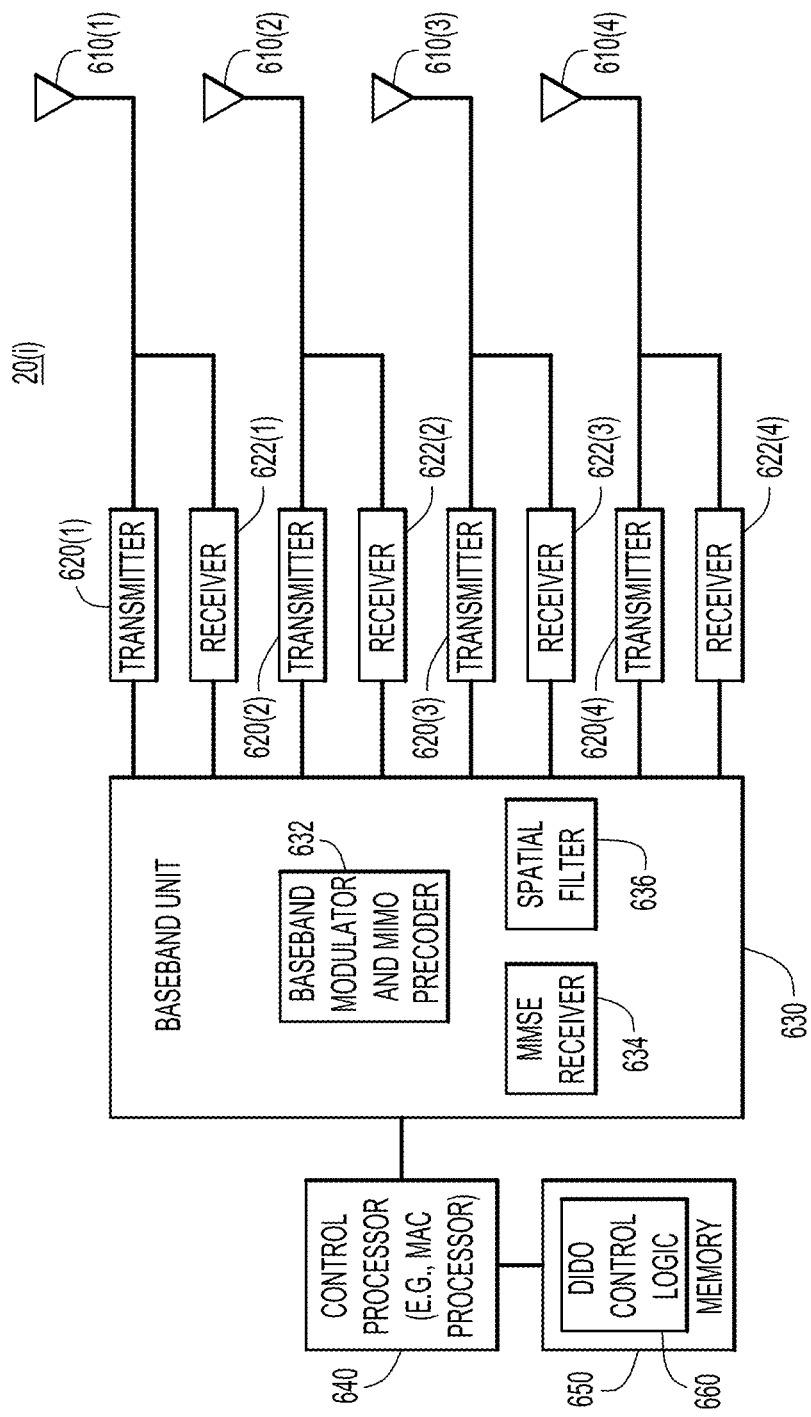

DISTRIBUTED PROCESSING DISTRIBUTED-INPUT DISTRIBUTED-OUTPUT (DIDO) WIRELESS COMMUNICATION

TECHNICAL FIELD

The present disclosure relates to wireless networks.

BACKGROUND

Wireless spectrum is a limited resource. As WiFi™ wireless local area networks become more prevalent, there will be higher density deployments that suffer from more co-channel interference, and the need to improve bandwidth per cell.

Multi-User Multi-Input Multiple-Output (MU-MIMO) techniques of IEEE 802.11ac can improve downstream throughput by transmitting to multiple clients at the same time. However, this assumes that there is traffic for multiple clients on the same access point (AP) and there is sufficient separation to adequately null between the two or more clients. In most cases, the data rates used for MU-MIMO will be lower than those that can be used for single user MIMO because nulling is not perfect, degrees of freedom are used for nulling versus signal-to-noise ratio improvement, and the combined channels will change more frequently.

Distributed-Input Distributed-Output (DIDO) techniques have even more potential value, but conventional DIDO techniques involve the use of a data center for centralized signal processing that has its own set of challenges. Network bandwidth requirements to communicate the raw modulated signals to all of the APs involved in a DIDO transmission are substantial, and this is exacerbated as more transmit antenna paths are added at each AP to improve the receive signal-to-noise ratio at clients. Consequently, current DIDO techniques are not practical as wireless data rates increase, e.g., as with IEEE 802.11ac. In addition, latency in responding to changing channel conditions is also an issue that is made worse by a centralized processing DIDO solution.

BRIEF DESCRIPTION OF THE DRAWINGS

FIG. 8 is an example of a block diagram of an access point configured to initiate and/or participate in distributed processing DIDO transmissions according to the techniques presented herein.

DESCRIPTION OF EXAMPLE EMBODIMENTS

Overview

A distributed processing Distributed-Input Distributed-Output (DIDO) wireless communication solution is presented herein. A plurality of base stations (e.g., APs) are provided, each configured to wirelessly serve one or more wireless devices (e.g., clients). At least first and second base stations are configured to transmit simultaneously at an agreed upon time. The first and second base stations are each configured to locally generate steering matrix information used to spatially precode their respective data transmissions in order to steer their respective data transmissions to their one or more wireless devices while nulling to the one or more client devices of the other base station. Moreover, the first and second base stations are each configured to locally generate a transmit waveform by applying the steering matrix information to their respective data transmissions.

Example Embodiments

A Distributed-Input Distributed-Output (DIDO) system involves coordinating simultaneous transmissions from multiple APs to multiple client devices so that different data streams, sent simultaneously from APs, reaches the intended client devices. In a conventional DIDO system, a DIDO data center receives the source data streams, processes them together to create processed signals, and sends the processed signals to the respective APs for simultaneous transmission to the target client devices.

Presented herein are techniques for two or more APs having Multi-User Multi-Input Multiple-Output (MU-MIMO) (or other similar) capability to re-use their baseband signal processing resources to achieve a distributed processing DIDO system solution. The term "coordinated simultaneous transmissions" is also used herein to refer to a distributed processing DIDO transmission. Instead of a centralized DIDO signal processing platform, distributed DIDO signal processing is achieved across the APs that are participating in a DIDO transmission.

While the techniques presented herein are described with respect to access points and clients operating in a wireless local area network (WLAN), this is not meant to be limiting. These techniques are also applicable to wireless wide area networks (e.g., cellular networks) and other types of wireless networks. Thus, more generally, these techniques are applicable to any wireless base station that serves wireless devices, often called "user devices", for wireless communication services. Thus, the term "base station" is meant to include APs in a WLAN as well as cellular-type base stations in wireless wide area networks and other types of networks, and the term "wireless device" is meant to include wireless client devices in a WLAN as well as user devices or user equipment (UE) in wireless wide area networks.

Figure 1:
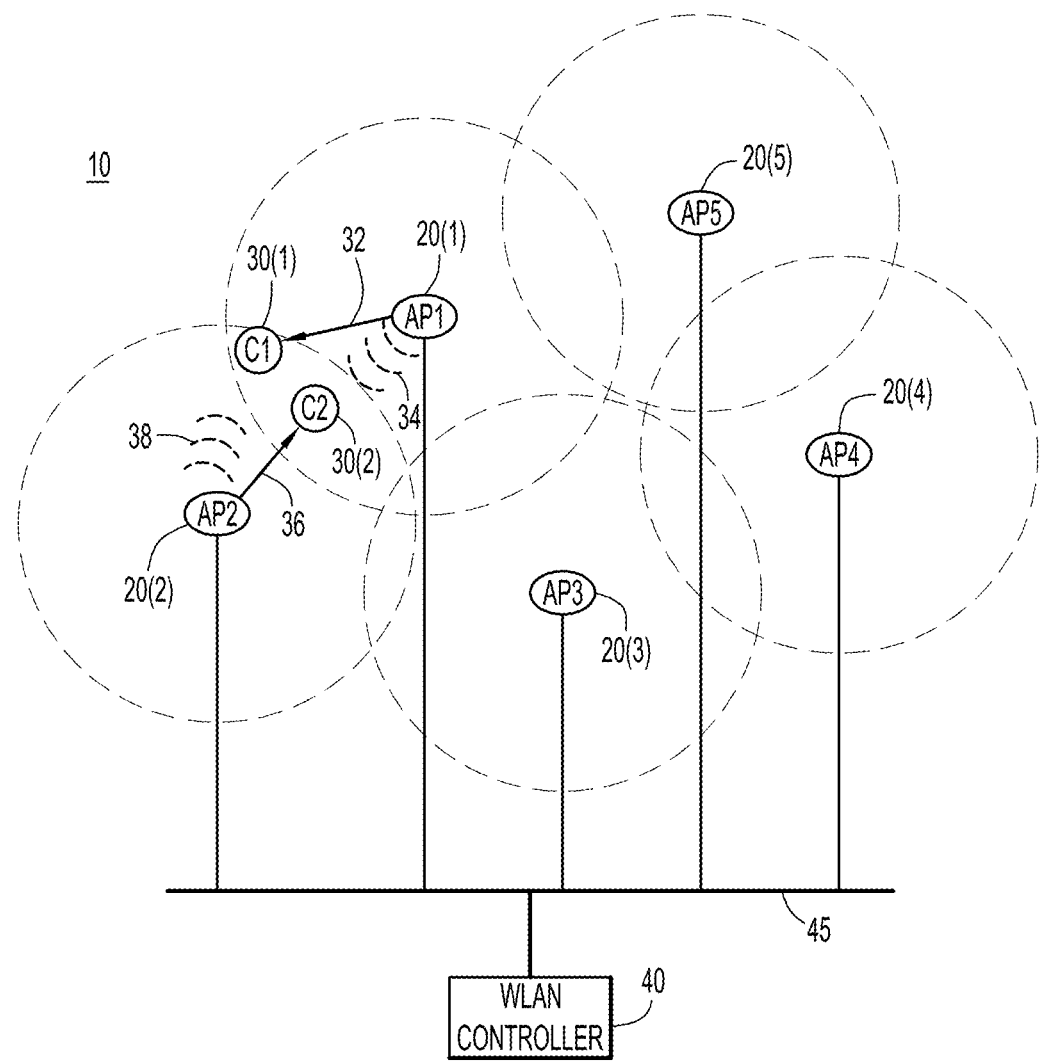
FIG. 1 is a diagram illustrating an example deployment of access points and clients in a wireless local area network configured to support distributed processing DIDO transmissions.

Reference is first made to FIG. 1. FIG. 1 shows a WLAN deployment 10 comprising a plurality of APs 20(1)-20(5) (also denoted AP1-AP5) and their clients. For example, AP 20(1) has client (C1) shown at reference numeral 30(1) and AP 20(2) has client C2 shown at reference numeral 30(2). Each AP shown shares a common radio frequency (RF) channel or has some portion of its channel overlapping with another AP. The collection of APs shown in FIG. 1 may be a subset of the total set of all APs in an area. The circles show the coverage and interference regions for each AP. This is the region for which a transmission from the AP can be received by a client. If a client is associated to another AP, then the transmission is considered interference.

Consider the case where both APs 20(1) and 20(2) are simultaneously transmitting to their respective clients. For the situation shown, client 30(2) is within the interference region of AP 20(1), so it will experience degraded signal-to-interference-plus-noise (SINR) when attempting to decode its desired signal from AP 20(2). Likewise, client 30(1) of AP 20(1) is within the interference region of AP 20(2). This condition is due to the omni-directional transmission of the signals and the lack of coordination between the APs.

The techniques presented herein eliminate this interference condition and allow for coordinated simultaneous transmissions from APs 20(1) and 20(2) to their respective clients. This is achieved as follows. Client 30(2) is within range of both APs 20(1) and 20(2), so that each AP may have knowledge of this. AP 20(1) spatially precodes its transmission such that it is beamformed to client 30(1) as shown at reference numeral 32 but forms a spatial null at client 30(2) as shown at reference numeral 34. Similarly, AP 20(2) spatially precodes its transmission such that it is beamformed to client 30(2) as shown at reference numeral 36 and nulls its transmission at client 30(1) at shown at reference numeral 38. In addition the APs may agree to coordinate the Acknowledgment (ACK) responses from the clients so that the ACK from client 30(2) does not interfere at AP 20(1) with the ACK from client 30(1). This may be done through a delayed Block Acknowledgment (BA) or by preloading the receiver of AP 20(1) to spatially suppress the ACK transmission from client 30(2) through a receiver interference suppression filter.

Additional details are presented hereinafter for performing distributed DIDO transmission schemes. Some of these schemes involve inter-AP communications. Although any of the coordination of clients which are likely candidates for distributed DIDO transmission, and setting up trust models between APs could be done over-the-air (OTA), for maximizing spectral use this could be done over a wired interface (i.e. out-of-band), either from AP-to-AP, or through a wireless controller/management device with increased latency. In general, information that is not highly latency dependent can be exchanged out-of-band, where as the last moment decisions and synchronizing the start of transmission is better handled OTA. To this end, FIG. 1 shows a WLAN controller 40 that communicates with the APs 20(1)-20(5) by way of a wired local area network (LAN) or wide area network (WAN) generally shown at reference numeral 45. The APs may communicate over the wired network for the out-of-band communications, either directly or via the WLAN controller 40.

It should be understood that in an OTA-initiated DIDO coordination as presented herein, each AP should be within another AP's coverage area to participate in the OTA DIDO coordination. Thus, in FIG. 1, not all of the illustrated APs could participate in an OTA-coordinated DIDO transmission, but FIG. 1 is meant to be an example and not intended to suggest that all APs shown can participate in such a OTA-coordinated DIDO transmission. However, DIDO coordination could be achieved entirely off-line as well through wired communications between APs.

Distributed DIDO Generally

Figure 2:
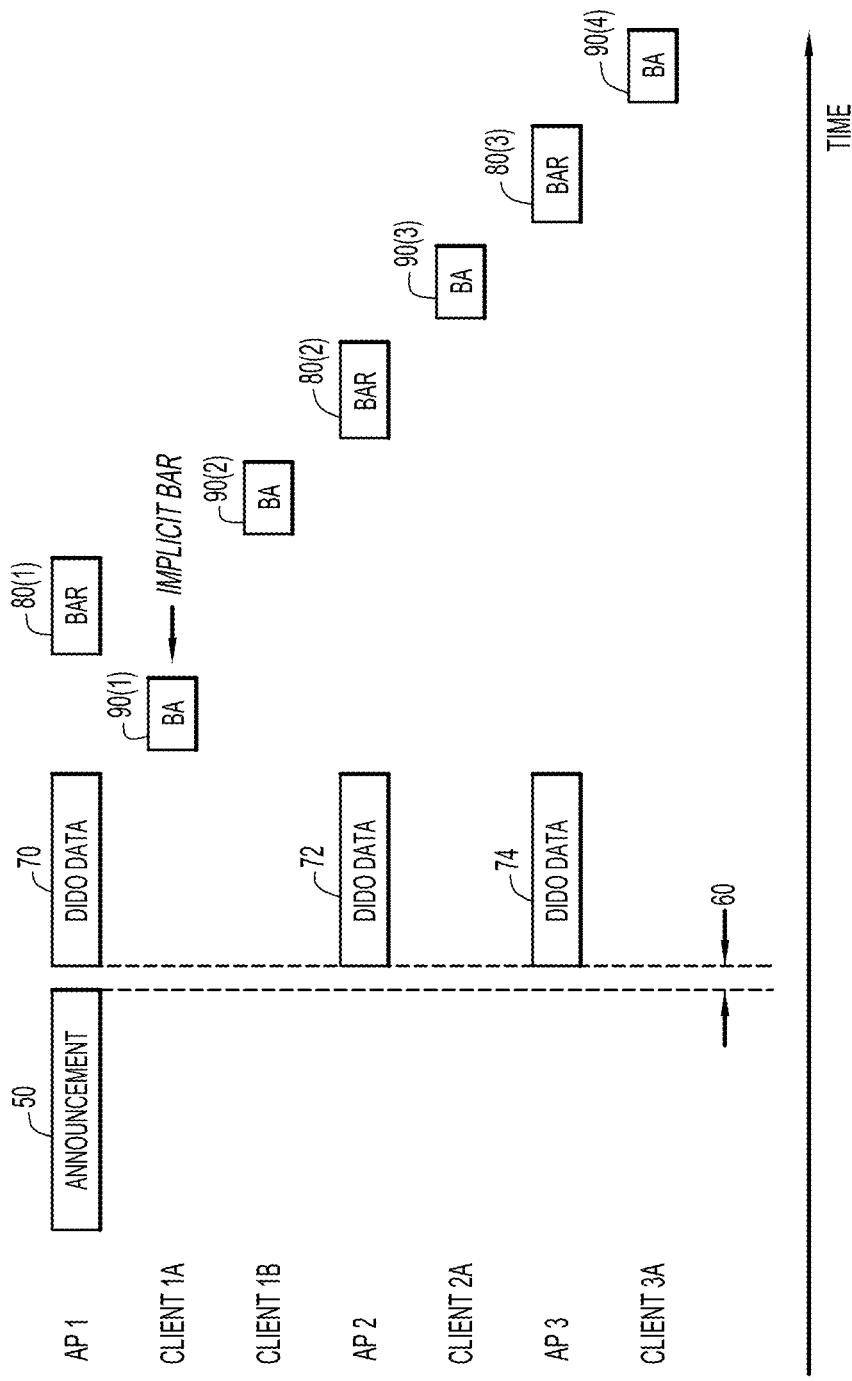
FIG. 2 is a diagram depicting a sequence of events among access points and clients for a distributed processing DIDO transmission.
Figure 3:
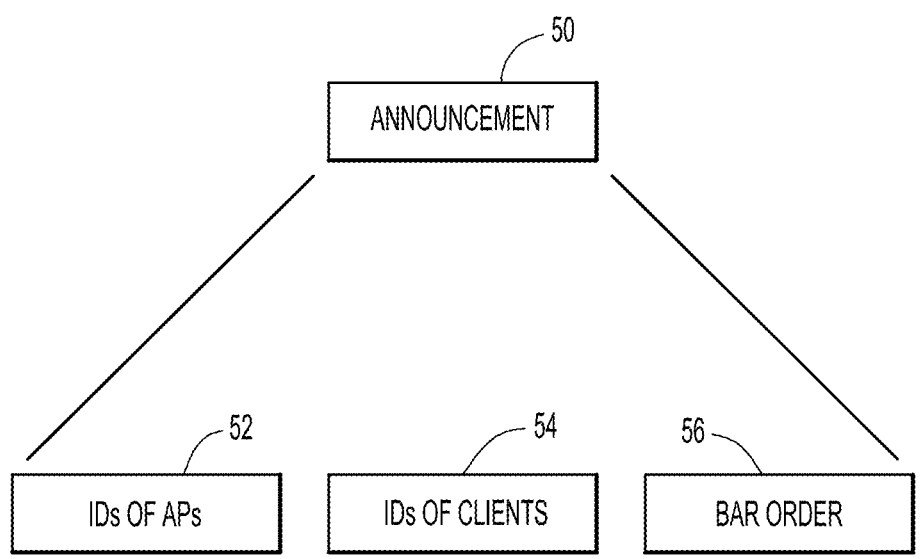
FIG. 3 is a diagram showing an example of an announcement frame used to initiate a distributed processing DIDO transmission.

Reference is now made to FIGS. 2 and 3. FIG. 2 shows a coordination scheme for DIDO transmissions according to the techniques presented herein. In a high-density AP deployment where multiple co-channel APs have significant or entirely overlapping coverage areas, downlink transmissions are coordinated in DIDO groups to optimize system capacity. This solution uses a lightweight decentralized media access control (MAC) coordination and decentralized baseband signal processing to enable simultaneous downlink DIDO transmissions between two or more APs.

To acquire steering matrix information (spatial precoding beamforming matrices and nulling matrices) at each AP, implicit sounding may be used by receiving upstream traffic from clients to another AP. From this received upstream traffic, steering matrix information may be generated that nulls to unintended clients and beamforms to intended clients, in much the same way as if they were two clients to which an AP would send a MU-MIMO transmission. The difference is, when transmitting, data is sent only on specific spatial stream, leaving another spatial stream reserved for other clients on another (peer) AP fallow. Thus, the decentralized nature of the baseband signal processing results from each AP generating beamforming steering matrix information to beamform to its intended clients and nulling steering matrix information to spatially null a transmission at unintended clients (of other APs).

Introduced herein are concepts of a DIDO group, a centralized process to form DIDO groups, and a decentralized protocol to coordinate DIDO transmissions, update spatial precoding and decide on DIDO participation within a Short Inter-frame Spacing (SIFS) interval.

Neighbor co-channel APs form DIDO groups that consist of a set of APs and a set of clients, where each client in the group is associated to one of the APs in the group. A subset of APs in a group may simultaneously transmit to a subset of clients in a group. Any AP in a DIDO group may initiate a coordinated transmission with other APs in the group through a protection frame announcing intent to transmit.

In the example of FIG. 2, there are three APs: AP1, AP2 and AP3. AP1 has clients 1A and 1B associated to it, AP has client 2A associated to it, and AP3 has client 3A associated to it. AP1 in this example initiates a coordinated transmission with AP2 and AP3. AP1 transmits an Announcement (protection) frame 50 to indicate the DIDO AP subset and client subset to be used. Each AP that elects to participate in the DIDO transmission will use spatial pre-coding to beamform to its intended client and null-steer to all other clients in the DIDO subset. Block ACK requests (BARs) are used to coordinate the client ACK responses following a DIDO transmission. The Announcement frame 50 designates the order in which participating APs initiate a BAR and implicitly a schedule for when to transmit the BAR frame.

FIG. 3 shows an example of an Announcement frame 50. The Announcement frame 50 contains a field 52 including information identifying, by an appropriate identifier (ID), each of the APs solicited to participate in the DIDO transmission, a field 54 containing IDs of each of the clients (of those APs) to participate in the DIDO transmission, and a field 56 indicating the order of BARs.

Referring back to FIG. 2. A SIFS interval 60 after the Announcement frame 50, the APs make their respective DIDO data transmissions shown at 70, 72 and 74. The DIDO transmissions 70, 72 and 74 are sent simultaneously, and are generated from a decentralized baseband signal processing, as described hereinafter. As described above, the Announcement frame 50 designates the order in which participating APs initiate a BAR and the schedule for when to transmit the BAR frame. The BAR sent by AP1 is shown at 80(1). Client 1A transmits an ACK first, shown at 90(1). The ACK may be an 802.11 ACK frame, BA frame (most typical), or other similar frame. For simplicity, FIG. 2 shows the ACK as a BA frame. As shown in FIG. 2, the first BAR 70(1) may be replaced by a request embedded in the DIDO frame so that the first ACK immediately follows the DIDO data transmissions

70, 72 and 74 (referred to as an implicit BAR in FIG. 2). Client 1B sends its BA 90(2) after BA 90(1), again, as indicated in the Announcement frame 50.

AP2 sends BAR 80(2) after all ACKs are expected to be transmitted by the clients of AP1. Client 2A is expected to send its ACK at 90(3). Similarly, AP3 sends BAR 80(3) after client 2A is expected to have sent its ACK. Finally, client 3A is expected to send its ACK at 90(4).

If an AP sends a BAR but no ACK is received after a period of time corresponding to a SIFS interval, then the next AP may protect the wireless channel by any of a variety of methods. Examples of these methods are sending a padded 802.11 High Throughput (HT) or Very High Throughput (VHT) BAR to fill time interval, sending its BAR early, relying on Network Allocation Vector (NAV) protection from the first BAR, sending a Clear-to-Send (CTS) to itself, and sending an energy burst (noise).

Each AP in a DIDO group needs to be able to hear each of the other APs, otherwise they will not hear the DIDO Announcement frame soliciting them to join a DIDO transmission. However, to overcome this, a multi-hop Announcement technique may be employed so that each AP repeats a received Announcement frame thereby enabling other APs to receive the Announcement frame through an intermediate AP. Moreover, each AP in the group needs to be able to hear every client in the group, otherwise they cannot null steer properly. This is because it is not possible to distinguish between the cases of a) the client is so far out of range that no null steering is necessary (benign), and b) the client has lower transmit power (thus, precoding is still necessary). Accordingly, the subsequent APs may wait for the BAR/BA exchange of the previous AP and client in the sequence before they begin their own BAR. An earlier AP can then retry BAR frames until either the client responds with a BA or the earlier AP sends a new "Yield" frame, which may take the form of a "fake" BA sent-to-self, for simplicity. Either frame triggers the next AP to send its BAR frame. In high density deployments, AP transmit power is often backed-off (reduced). Therefore, the case may arise in which the Announcement frame is sent at higher power than the subsequent DIDO transmission (data). In such cases, the BAR or lost BA should also be sent at higher power to be sure cooperating APs stay in sync.

An AP can know with high probability that a particular client of another AP is out of range, and therefore does not need to generate and apply precoding parameters to null to that particular client. Moreover, an AP may detect a particular client of another AP, and nevertheless decide not to null to that client for any of a variety of reasons.

Distributed DIDO Transmission Flow

Figure 4:
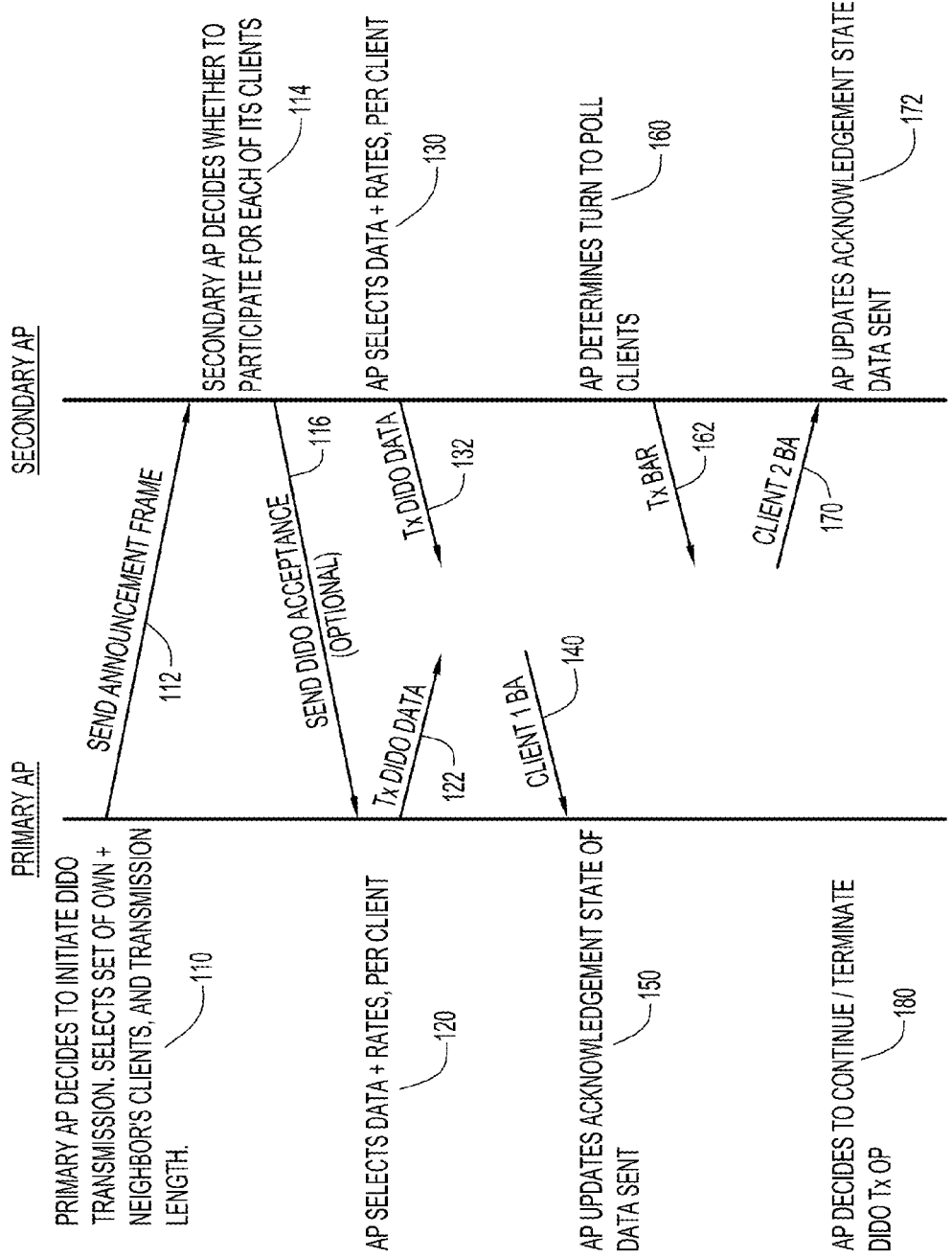
FIG. 4 is a ladder diagram depicting an example of operations performed by an initiating access point and participating access point in a distributed processing DIDO transmission.

Reference is now made to FIG. 4. FIG. 4 shows a sequence of operations performed to enable the DIDO transmission scheme depicted in FIG. 2. In connection with the description of FIG. 4, one AP is designated as the "Primary" AP and the other APs are "Secondary" APs. The Primary AP may be considered the coordinating AP and each Secondary AP may be considered a participant AP. As shown at 110, the Primary AP is the AP that initiates a DIDO transmission, and selects a set of its own clients and clients for each of the neighboring APs to be solicited to participate in a DIDO transmission. The Primary AP also sets the length (in time) of the DIDO transmission. The Primary AP generates an Announcement frame containing or implying all of the necessary information, as described above in connection with FIGS. 2 and 3, and sends the Announcement frame at 112 to each AP (Secondary APs) that is solicited to participate in the DIDO transmission. At 114, the Secondary AP evaluates the received Announcement frame and determines whether to participant in the DIDO transmission for each of its clients. If it decides to participate in the DIDO transmission, then the Secondary AP generates and sends to the Primary AP a message indicating acceptance of the offer to participant in the DIDO transmission. The transmission of an acceptance message at 116 is optional because the Announcement frame contains the parameters of the DIDO transmission session and schedules ACKs accordingly so that it is not necessary for the Primary AP to receive confirmation or acceptance from a Secondary AP.

At 120, the Primary AP selects the data and rates to be used in the DIDO transmission for each client. Similarly, at 130, the Secondary AP selects the data and rates to be used in the DIDO transmission for each client. At 122, the Primary AP transmits its DIDO data, and at 132, the Secondary AP transmits its DIDO data (at the same time the Primary AP transmits).

The Primary AP receives ACKs from its clients first. Thus, at 140, client 1 (associated to the Primary AP) sends its BA to the Primary AP. Though not shown in FIG. 4, other clients of the Primary AP that are intended recipients of the DIDO data from the Primary AP are polled with a BAR from the Primary AP. At 150, the Primary AP updates its acknowledgment state for the DIDO data it sent based on received BAs from its clients. Any of the APs that receive the BA may update its CSI based on this BA. At 160, the (first) Secondary AP determines when it is its turn to poll its clients for acknowledgment after the completion of the scheduled ACK phase for the Primary AP (based on information contained in the Announcement frame). The Secondary AP transmits a BAR at 162. At 170, clients of the Secondary AP send their BAs. For example, client 2 associated to the Secondary AP transmits its BA. At 172, the Secondary AP updates its acknowledgment state for the DIDO data it sent based on the received BA from client 2. After the completion of acknowledgment phase, at 180, the Primary AP determines whether to continue or terminate the DIDO transmission opportunity (TxOP). The process then repeats with a new Announcement frame.

To summarize, for the first AP (Primary AP), the first client receives an implicit BAR within the payload of the DIDO transmission made by the first AP. Subsequent clients of the first AP receive actual BAR frames. For the second and subsequent APs (Secondary APs), each client receives its own actual BAR frame. Therefore, the first AP can send zero or more actual BAR frames, and subsequent APs can send one or more BAR frames. Consequently, the announcement frame can define the schedule per client or per AP and let the AP do the fine-grained per-client scheduling.

Maintaining Updated Channel State Information

Each AP in a DIDO group maintains channel state information (CSI) between itself and all clients in the DIDO groups that are candidates for inclusion in a DIDO transmission. An AP may obtain CSI through several methods, such as implicit sounding from opportunistic monitoring of uplink frames or VHT Request-to-Send/Clear-to-Send (RTS/CTS) frame exchanges, through explicit sounding as provided in the IEEE 802.11 standards, or some hybrid thereof. The VHT RTS/CTS frame exchanges may be initiated by the client's associated AP and monitored by neighboring APs to fully sound the uplink channel. Any of these methods is sufficient for each AP in the DIDO group to obtain CSI for 80, 160 or 80+80 MHz channels required for spatial precoding between itself and all other clients in the DIDO group. For DIDO transmissions of lower bandwidth, 802.11a, HT or VHT RTS/CTS exchanges may also be used for sounding. The BA sent in duplicate mode (80, 160 or 80+80 MHz) can be used to implicitly sound the full bandwidth of the channels occupied by the BA.

Figure 5:
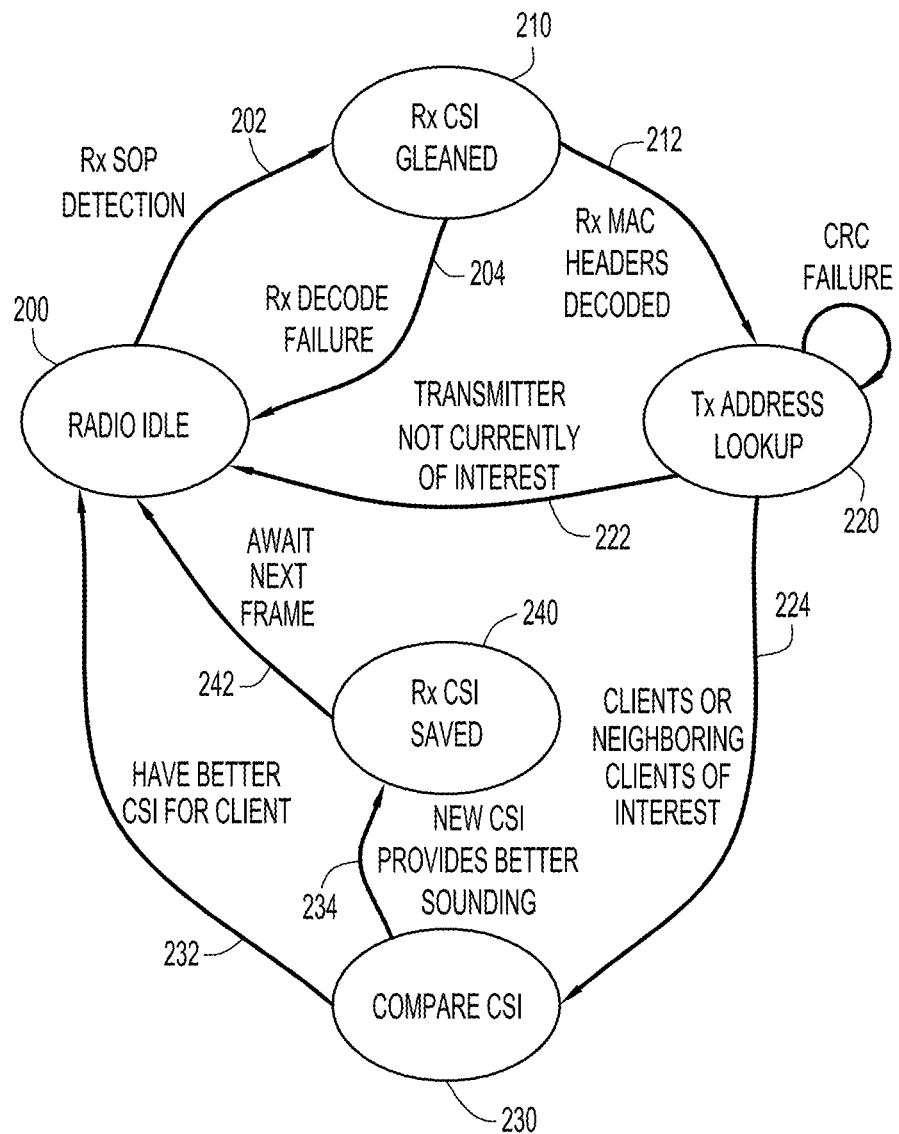
FIG. 5 is a state diagram depicting operations associated with obtaining channel state information for clients.

Reference is now made to FIG. 5 for description of a state diagram depicting an example by which APs may obtain the necessary CSI. The five states are Radio Idle 200, Received (Rx) CSI Gleaned 210, Transmit (Tx) Address Lookup 220, Compare CSI 230 and Rx CSI Saved 240. The AP is in the Radio Idle state 200 waiting for an Rx start-of-packet (SOP) detection. When Rx SOP detection occurs at 202, then a transition to the Rx CSI Gleaned state 210 is made. When in state 210, CSI is obtained from the received frame. If the MAC headers can be properly decoded from the received frame at 212, then a transition is made to the Tx Address Lookup state 220. Otherwise, if the frame cannot be decoded at 214 a transition is made back to the Radio Idle state 200.

In the Tx Address Look up state 220, a cyclic redundancy check (CRC) is made on the received frame. If there is a CRC failure, then processing stays in state 220. If based on the recovered MAC address information of the received frame, it is determined that the frame originated from a transmitter (client) that is not currently of interest at 222, a transition is made to the Radio Idle state 200. On the other hand, if based on the recovered MAC address information of the received frame, it is determined that the frame originated from an associated client or a client of a neighboring AP that is of interest at 224, a transition is made to the Compare CSI state 230. A client that is "of interest" is a client that is a candidate for inclusion in a distributed processing DIDO transmission session. As described below, CSI is stored for other neighbors to determine if they might be good future candidates, i.e., by observing traffic to them, or for determining that their CSI does not correlate the AP's clients of interest.

In the state 230, the CSI of the received frame for this client is compared against currently stored CSI for that client. If the AP determines that it already has better CSI for that client, then a transition at 232 is made to the Radio Idle state 200. If it is determined that this new CSI is better than what it had previously (if it had CSI for this client previously), then at 234 a transition is made to Rx CSI Saved state 240 to save this new CSI. After the new CSI is saved, a transition is made at 242 to the Radio Idle state 200 to wait for the next received frame.

Forming and Updating DIDO Groups

The formation and updating of DIDO groups is done through centralized processing of AP neighbor lists. Each AP reports a neighbor list of APs and clients. The neighbor list may contain Receive Signal Strength Information (RSSI), and some function of the CSI between itself and all other APs and clients within range. The DIDO groups are formed based on the neighbor list information and matching/similar downlink traffic patterns to associated clients. Selection is made of clients that have more regular downstream traffic, as they can be coordinated out-of-band. Also if a first AP hears a first client that is associated with the first AP, with a higher RSSI than a second (foreign) client that is not associated with the first AP, and similarly a second AP hears the second client associated with the second AP, at a higher RSSI than the first client, then each AP transmitting to their associated client would tend to provide less interference, as each AP would be expected to have a stronger signal to their respective client before the null-steering is applied. That is to say, in a high density deployment, the AP transmit power is already backed off to reduce co-channel interference (CCI), and if many/most of its clients are closer to it than to the peer AP, the RSSI from the associated AP would be higher, and so less interference would be seen from its peer AP should the frames collide without null-steering, possibly allowing 6 Mbps reception. Null-steering would be used to improve the available SNR. Finally, as always, it is important to ensure that sufficient null-steering is possible between the given set of clients.

In another example, groups may be implicit. All APs attempt to measure and store CSI for all clients in their vicinity that send/receive data/management frames to/from a neighboring AP. If the Announcement frame lists a subset of clients, all of which a further AP already has recent CSI for, then the further AP can participate in the DIDO transmission (via beamforming to its desired client(s) and null steering to all other listed clients). In this example, no centralized group formation or inter-AP CSI distribution is needed since more than 10 dB isolation (nulling) is provided by AP separation.

Clients may be added to Multi-User groups based on mechanisms such as multicast to unicast (MC2UC) subscription, or streams that persist for a reasonable time. This more limited information may be exchanged on the wire or over-the-air, as well as by estimating that neighbor AP's clients are good candidates by the number of downstream MAC Protocol Data Units (MPDUs). In addition, an estimate of the age of sounding information, assuming uplink transmissions are received, or the Announcement, can have a response specifying how much SNR is expected to be lost. A tendency may be made for those clients to be closer to the AP they are serviced by, as noted by relative RSSI. In addition, clients and APs may be grouped based on history of active flows. If overzealous grouping is made, clients without traffic would be included and thus degrade the modulation/coding schemes for desired clients. Clients may be excluded in the future, downgrading based on poor expectations. The Announcement response may be used for grouping, but the typical overhead may exceed the occasional overzealous overhead.

Although central processing is used to form and update DIDO groups, this may be done on a long time-scale relative to the changing channel conditions since CSI is updated and maintained at each AP without centralized signal processing. Moreover, the decision to participate in the DIDO transmission is made at each AP independent of the other APs. An AP may initiate a DIDO group change or merely suggest a change is needed based on the following:

1. Client in a DIDO group loses association.
2. New client associates to an AP.
3. The RSSI and/or CSI of a client in a DIDO group changes dramatically.
4. AP tracks client CSI and correlation with other clients CSI in a DIDO group and increased correlation is above a threshold.

As described above, coordination of clients which are likely candidates, and setting up trust models between the AP could be done over-the-air. Information that is not highly latency dependent can be exchanged out-of-band, where as the last moment decisions and synchronizing the start of transmission is better handled over-the-air.

Figure 6:
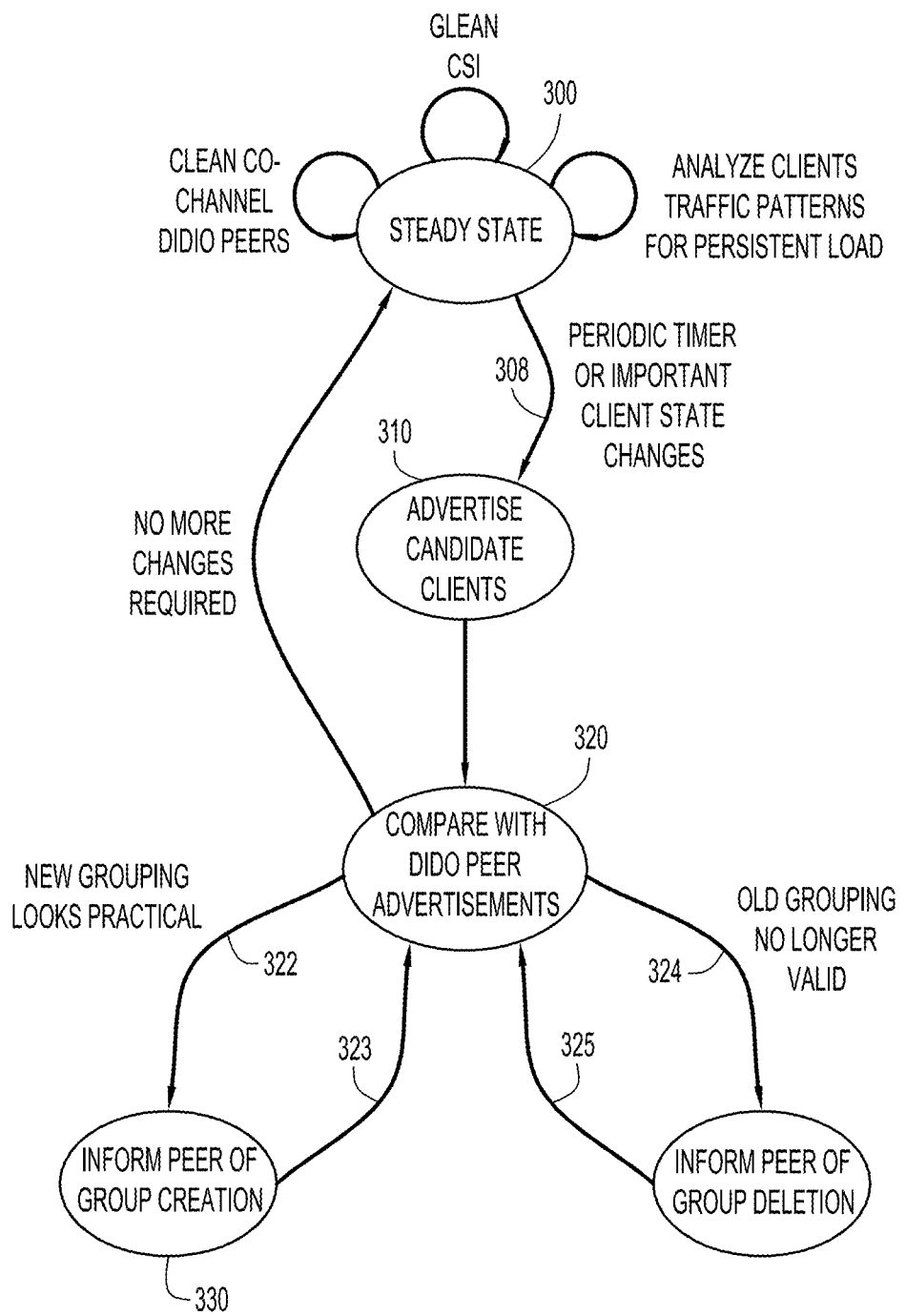
FIG. 6 is a state diagram depicting operations associated with forming and updating DIDO groups of access points and clients.

Turning now to FIG. 6, a state diagram is shown that is useful for forming DIDO groups. There are five states: Steady State 300, Advertise Candidate Clients 310, Compare with DIDO Peer Advertisements 320, Inform Peer of Group Creation 330 and Inform Peer of Group Deletion 340. Steady State 300 involves various updates to information used for managing DIDO groups, including gleaning CSI from received frames at 302, gleaning co-channel DIDO peers from received frames at 304, and analyzing client traffic patterns for persistent load at 306. All of these actions are performed while in Steady State 300. When a periodic timer expires or some important client state changes at 308, a transition is made to the Advertise Candidate Clients state 310. In state 310, the AP sends to its neighboring APs a message informing those APs of its clients that are candidates for use in a DIDO grouping for a DIDO transmission session.

In state 320, the AP compares information about candidate clients received in advertisements from its neighbor APs (peers) with the information generated locally, i.e., in Steady State 300. Thus, in state 320, the AP determines whether a change should be made to a DIDO grouping. For example, it may be determined that a new DIDO group should be made. If so, a transition is made at 322 to Inform Peer of Group Creation state 330. In state 330, the AP sends a message to its peer APs informing them of the new DIDO group. After the AP's peers are informed of the DIDO group creation, a transition is made at 323 back to state 320. As another example, it may be determined that an old DIDO grouping is no longer valid. In this case, a transition is made at 324 to Inform Peer of Group Deletion state 340. In state 340, the AP sends a message to its peer APs informing them of the deletion of a DIDO group. After the peer APs are notified of the DIDO group deletion, a transition is made at 325 back to state 320. In state 320, if it is determined that no more changes are needed, a transition is made at 326 back to Steady State 320.

Out-of-Band Negotiation for Queue Depth

Conveying information about queue depth by client/AP between APs may be done on an opportunistic basis. However, there may be negotiation of which AP has active high bit rate flows, and delaying the transmission based on the peer AP's history for reaching the threshold. It is advantageous to have a very small time gap between starting of a transmission (staying well under the cyclic prefix of 0.8 μs as seen by clients) so that the initiating AP can send out a protection frame, such as an Action_No_Ack frame. The protection frame could be addressed to a single peer AP, or it may use a multicast address, or combination of multicast address and further fields, to select several peer APs by pre-arranged signaling. The DIDO transmission would be started an SIFS time interval after this protection frame. The APs would need to agree on several parameters, such as DIDO duration and which set of clients to which the transmission is being made. The duration might be explicitly called out within the protection frame, or implied by the NAV. The clients that would be nulled could be called out by MAC Address, Basic Service Set Identifier and Associated Identifier (BSSID+AID), or other negotiated ID mappings within the protection frame.

The order in which BAR polling would be done is also conveyed, as the initiating AP might send to one or more Secondary APs, and the peer AP(s) could similarly have multiple clients. Finally, information may be included as to how well nulling is expected, to better support the peer AP's rate selection.

Since it is opportunistic in nature, the peer AP might not have data to send, or might not receive the Announcement without a cyclic redundancy check (CRC) error. The peer AP is free to decline the privilege and not transmit. The chance that the Announcement is lost should be relatively low, as this would not need to push the highest data rates and in most cases would be between two 4×4 MIMO APs.

If there is value in negotiating parameters, a response frame to the Action_No_Ack frame may be supported in order to specify an alternate client or duration, or to indicate that the peer AP's nulling is less than expected and therefore rate selection might need to account for that. Such a response could be used to propagate the protection region. Another use for the response would be to allow a one-hop peer to include a $2^{nd}$-hop peer. Any such action frames could use Management Frame Protection (MFP) to protect against Denial of Service (DoS) attacks.

The OTA transmission may be:
AnnounceNoAck-DIDO-BA-BAR-BA, or
AnnounceNoAck-AnnounceResponseFromAP2-DIDO-BA-BAR-BA,
AnnounceNoAck-AnnounceResponseFromAP2-AnnounceResponseFromAP3-DIDO-BA-BAR-BA-BAR-BA AP Synchronization to Coordinate Transmissions This techniques presented herein rely on a method of synchronization across participating APs. There are two possibilities for AP synchronization to coordinate transmissions. Either the AP clocks are time and frequency locked, or only frequency locked. Clock synchronization between APs may be achieved by a number of methods:

OTA synchronization frames with time-of-departure (TOD) and time-of-arrival (TOA) processing as disclosed in U.S. Pat. No. 8,249,049;

Distributed reference oscillator to provide frequency lock;

Distributed reference oscillator with periodic synchronization frames for time/frequency lock;

Synchronization frames time-stamped with TOD/TOA measurements along with knowledge of AP positions provides additional synchronization data;

IEEE 1588 distributed clock synchronization; and

Sub-1 ppm clock alignment in manufacturing calibration, achieved with existing clock pulling programmable capacitor bank in RF transceiver.

For the case of frequency lock across APs, DIDO transmissions are aligned an SIFS interval after the end of the protection frame as shown in FIG. 2. There are several sources of misalignment.

1. Receiver start-of-packet will not align perfectly on the OFDM symbol due to multipath effects.
2. The propagation delay between the initiating AP and participating APs. (Measuring and correcting for propagation delay is possible with TOD/TOA multiple frame exchanges.)
3. Any residual frequency lock error causes clock drift over the SIFS interval wait period.

For the case of time/frequency lock across APs, DIDO transmissions are more easily coordinated. Inclusion of a TOD time-stamp in the protection frame is used to fix the SIFS interval wait period relative to the exact transmission time of the protection frame. The inclusion of the TOD reference resolves the errors in (1) and (2) above. However item (3) can be controlled adequately through the methods of synchronization previously described.

Simultaneous ACK Reception with Coordinated Nulling

There are legacy clients that do not support delayed ACK/BA, and so will always respond a SIFS time after the DIDO frame. Those legacy clients cannot be controlled as to when to transmit their ACK frames, and thus could transmit their ACK frames at the same time other clients are transmitting an ACK frame as part of the DIDO session. For example, this may involve two 802.11a clients (one per AP). If each AP receives signals from its client stronger than the other AP hears their clients, then it is possible to allow the client responses to overlap. The downside that the other AP loses the implicit sounding to refresh its nulling weights is outweighed by the substantial savings in air time.

Techniques are presented to anticipate collisions of ACK frames from two or more legacy clients by preloading a receive interference suppression filter of a first AP based on knowledge of a neighboring (second) AP's client ACK that the first AP does not want to receive/detect. The AP that is to apply the receive nulling swaps the receive nulling weights per receive frame as needed for proper nulling of an overlapping ACK.

Figure 7A:
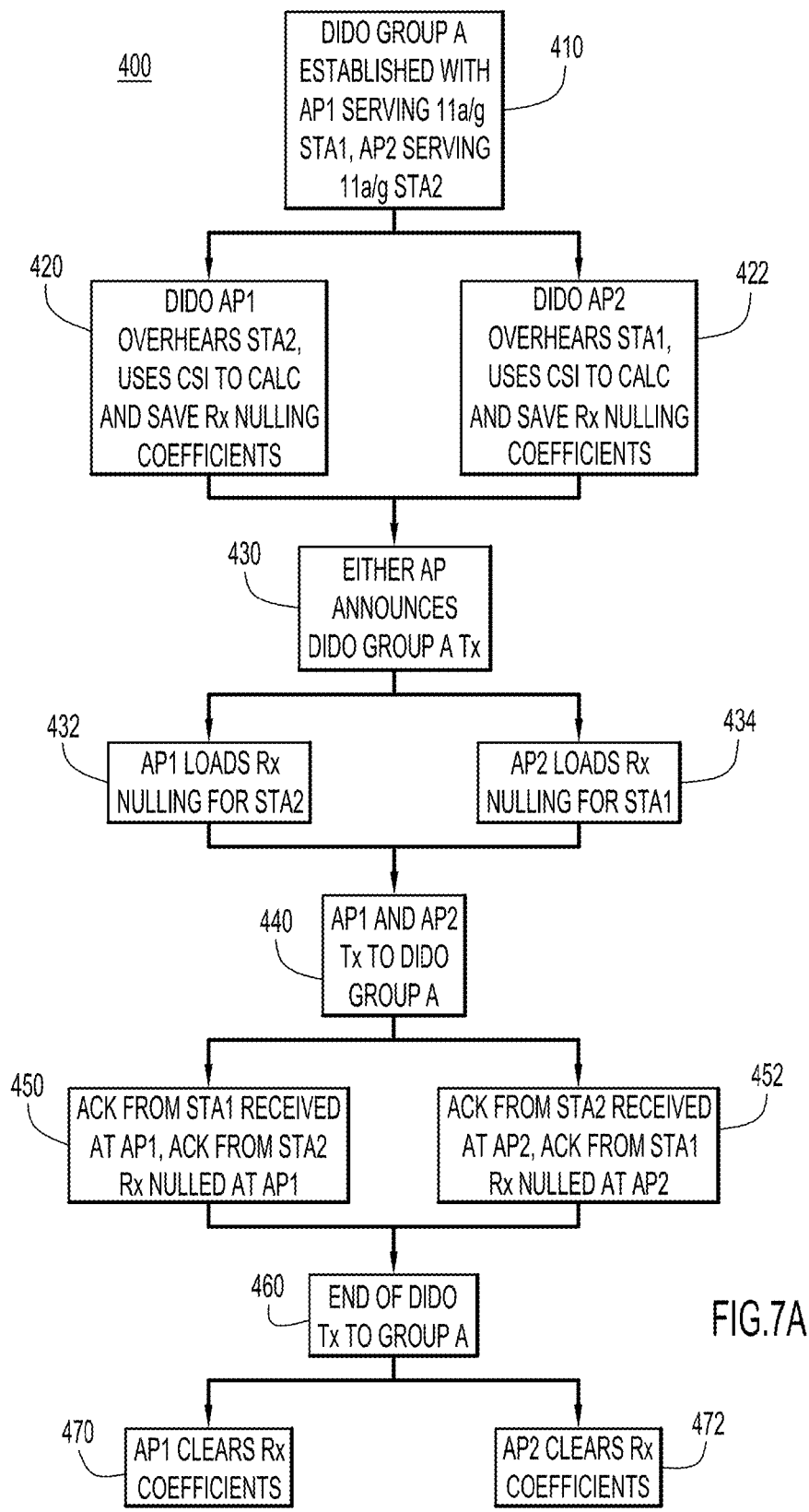
FIGS. 7A and 7B are diagrams depicting techniques to spatially null acknowledgment frames from legacy clients in distributed processing DIDO transmissions.

Referring to FIG. 7A, a flow chart is presented for a procedure 400 that exploits receive nulling capability of APs to allow for overlapping ACKs/responses from clients. At 410, DIDO group A is formed with AP1 serving legacy client STA1, and AP2 serving legacy client STA2. For example, STA1 and STA2 are 802.11a or 802.11g clients. At 420, AP1 overhears (receives) a transmission made by STA2 to AP2. AP1 uses CSI from reception of this transmission to compute and save receive nulling weights for STA2. Similarly, at 422, AP2 overhears (receives) a transmission made by STA1 to AP1; AP2 uses CSI from reception of this transmission to compute and save receive nulling weights for STA1.

At 430, either AP1 or AP2 announces a DIDO group A transmission session. At 432, AP1 loads the receive nulling weights for STA2, and at 434 AP2 loads the receive nulling weights for STA1. At 440, AP1 and AP2 make their DIDO transmissions in DIDO group A. At 450, the ACK from STA1 is received at AP1 and AP1 nulls the ACK it receives from STA2. Similarly, at 452, the ACK from STA2 is received at AP2 and AP2 nulls the ACK it receives from STA1. At 460, the DIDO transmission to DIDO group A ends. At 470, AP1 clears its receive nulling filter weights (coefficients) and at 472, AP2 clears its receive nulling filter weights (coefficients).

Figure 7B:
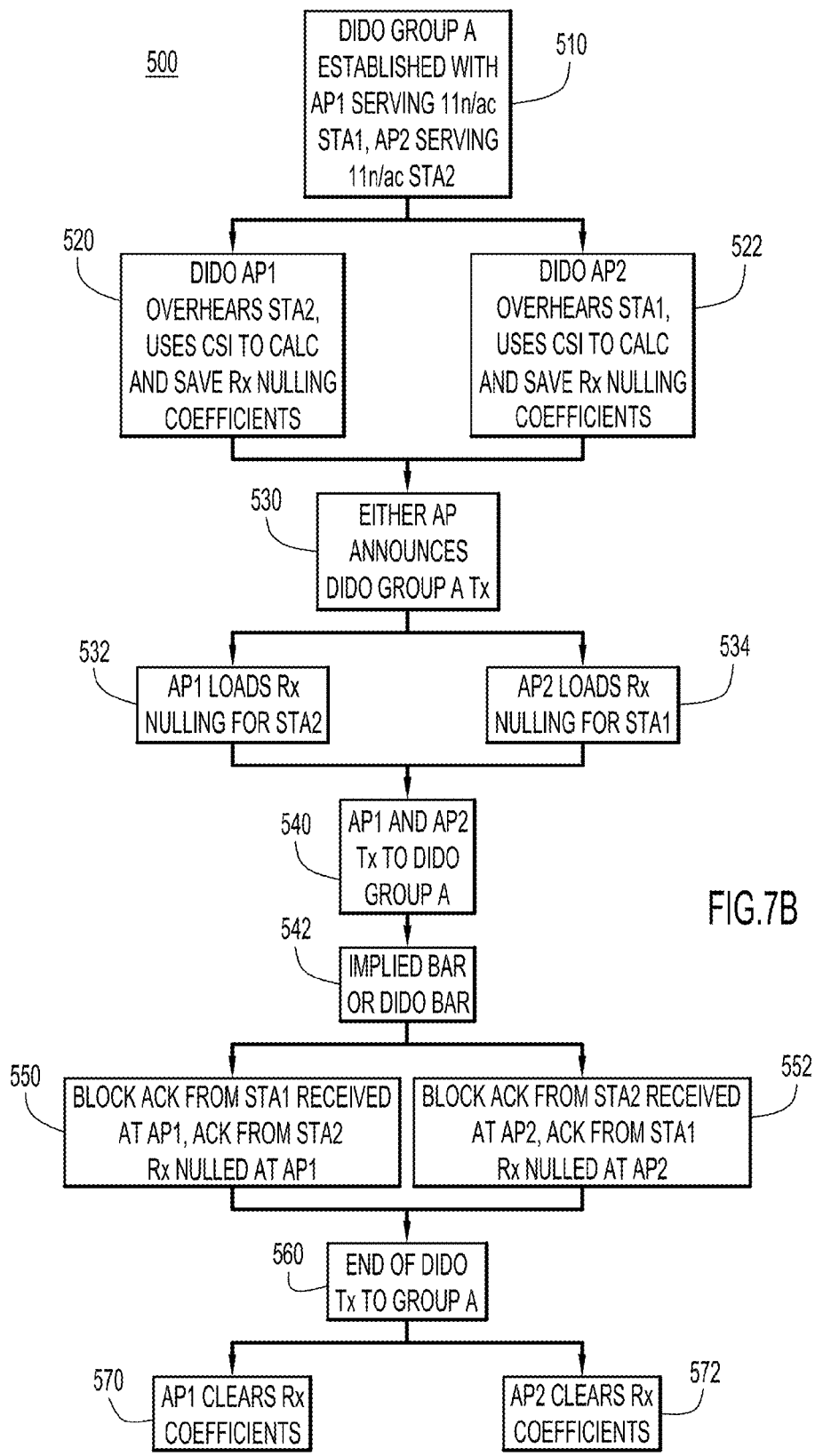

Turning now to FIG. 7B, a flow chart for a process 500 is now described. Process 500 is similar to process 400 shown in FIG. 7A, with some exceptions. Operations 510-540 are similar to operations 410-440 of FIG. 7A except that the clients are not legacy clients. For example, STA1 and STA2 are 802.11n or 802.11ac clients. At 542, after AP1 and AP2 make their DIDO transmissions, an implied BAR occurs or a DIDO BAR is sent. When each AP sends a DIDO transmission to more than one client, then the first BAR is implicit and a DIDO BAR is used for the next set of clients, as indicated at 542. At 550, AP1 receives the BA from STA1 and nulls the ACK received from STA2. Conversely, at 552, AP2 receives the BA from STA2 and nulls the ACK received from STA1. At 560, the DIDO transmission session to DIDO group A ends. At 570, AP1 clears its receive nulling filter weights (coefficients) and at 572, AP2 clears its receive nulling filter weights (coefficients).

In summary, FIGS. 7A and 7B depict processing flows for situations in which each of at least one client associated to each of two neighboring APs transmits an acknowledgment frame that at least partially overlaps in time with the acknowledgment frame transmitted by a client to the neighboring AP. The ACK frames may overlap because the clients are legacy clients and do not follow the rules for delayed ACK/BA, or because an implied BAR procedure is used. In either case, each AP needs to spatially null the received ACK that was transmitted by the client to the neighboring AP.

Referring now to FIG. 8, a block diagram is shown of an AP (or more generally, a base station) configured to perform the distributed DIDO techniques described herein. The diagram in FIG. 8 is meant to be representative of any of the APs referred to herein that are capable of serving as a Primary/Coordinating/Initiating AP or as a Secondary/Participating AP in a distributed DIDO transmission session. For simplicity, the AP shown in FIG. 8 is generically identified by reference numeral 20(i).

The AP comprises a plurality of antennas, e.g., four antennas, 610(1)-610(4), and a plurality of transmitters 620(1)-620(4) and receivers 622(1)-622(4) each coupled to a corresponding one of the plurality of antennas 610(1)-610(4). A baseband processing unit 630 is coupled to the block of transmitters 620(1)-620(4) and block of receivers 622(1)-622(4). A control processor 640 is coupled to the baseband processing unit 630. The control processor 630 performs high level control of the AP as well as software-controlled MAC functions of the AP. The control processor 630 may comprise a microprocessor or microcontroller that executes software instructions stored in memory 650. To this end, the memory 650 stores instructions for DIDO control logic 660 that, when executed by the control processor 630, cause the control processor 630 to perform the operations described herein to allow an AP to initiate (serve as a coordinating or Primary AP) to coordinate a decentralized DIDO transmission session or to participate (serve as a Secondary AP) in a decentralized DIDO transmission session initiated by another AP.

The baseband processing unit 630 may be implemented by digital logic gates in one or more application specific integrated circuits, or may be implemented by software executed by the control processor 640. In either case, the baseband unit 630 includes logic for baseband modulation and MIMO precoding block 632, a receiver 634 (such as a minimum mean squared error (MMSE) receiver), and a spatial filter 636 for performing receive spatial filtering on signals received at the plurality of antennas 610(1)-610(4). The baseband modulation and MIMO precoding block 632 is used to spatially precode transmit data (across the plurality of antennas 610(1)-610(4)) to one or more associated intended clients on corresponding one or more spatial streams and to null steer to other clients in a DIDO subset. Conversely, the spatial filter 636 is used to spatially process received signals so as to null out received signals transmitted by a peer AP or a client associated with a peer AP.

The memory 650 may comprise read only memory (ROM), random access memory (RAM), magnetic disk storage media devices, optical storage media devices, flash memory devices, electrical, optical, or other physical/tangible memory storage devices. Thus, in general, the memory 650 may comprise one or more tangible (non-transitory) computer readable storage media (e.g., a memory device) encoded with software comprising computer executable instructions and when the software is executed (by the processor 640) it is operable to perform the operations described herein.

In summary, techniques are presented herein for decentralized DIDO signal processing. Each AP that is to participate in a DIDO transmission session performs the necessary spatial precoding to beamform to its intended recipient clients and spatially null to clients of its peer APs. These techniques are designed to work under a Carrier Sense Multiple Access/Collision Avoidance (CSMA/CA) MAC process. An AP that receives a DIDO Announcement frame can immediately decide whether (or not) to participate within a period of time corresponding to an SIFS interval. Since the time or age sensitive CSI data is obtained and fully utilized for precoding at the AP, the latency concerns of a fully centralized DIDO solution are avoided with the decentralized DIDO signal processing schemes presented herein. Moreover, each AP maintains information on when each client's channel was sounded. Therefore, the decision as to whether to participate in a DIDO transmission can be made within an SIFS interval based in part on the age (quality) of the CSI available. This is in stark contrast to fully centralized DIDO solutions in which CSI latency prevents such decision in time to prevent the use of bad CSI data.

Even more critical is usage of wired bandwidth in a traditional (centralized) DIDO solution. In traditional DIDO systems, the traffic must be sent to a centralized data center where the encoding is done, and the encoded data can be an order of magnitude larger than the original packets which were encoded. This may be acceptable for very low bit rate wireless systems, but for higher rate systems (e.g., IEEE 802.11ac with rates starting at over 1 Gbps), it becomes a scaling issue for the network. At least two 10G Ethernet cables would be needed to each AP for sufficient bandwidth to support traditional DIDO on an 80 MHz wireless channel with a 4×4 single radio AP. This does not address the number of network ports required on the server in the data center, and scaling of the wired side infrastructure, which would be very expensive to deploy.

As explained above, while the foregoing description uses the terms "APs" and "clients", it is to be understood that these techniques are not limited to use in IEEE 802.11 WLANs. Thus, the term "base station" is intended to broadly refer to APs and other wireless access devices that serve wireless devices any type of wireless network (local or wide area). Likewise, the term "wireless device" is meant to broadly cover wireless client devices, mobile stations, user equipment, etc.

From a system perspective, a system is provided comprising a plurality of base stations each configured to wirelessly serve one or more wireless devices, wherein at least first and second base stations are configured to transmit simultaneously at an agreed upon time. The first and second base stations are each configured to locally generate steering matrix information used to spatially precode their respective data transmissions in order to steer their respective data transmissions to their one or more wireless devices while nulling to the one or more client devices of the other base stations. The first and second base stations are also configured to locally generate a transmit waveform by applying the steering matrix information to their respective data transmissions.

From the perspective of a method performed at one base station, e.g., a first base station, in a wireless network, a method is provided comprising: generating steering matrix information for spatially precoding a first transmission to be sent via a plurality of antennas of the first base station to beamform the first transmission to one or more wireless devices served by the first base station while nulling to one or more wireless devices served by at least a second base station; and generating a transmit waveform by applying the steering matrix information to the first transmission, the transmit waveform to be sent by the first base station simultaneously with the sending of a transmit waveform for a second transmission by the second base station via a plurality of antennas of the second base station at an agreed upon time with the second base station, the transmit waveform for the second transmission having been generated by the second base station using steering matrix information generated at the second base station to beamform the second transmission to one or more wireless devices served by the second base station while nulling the second transmission to one or more wireless devices served by the first base station.

This method may also be embodied by instructions stored or encoded in a computer readable storage media that, when executed by a processor, cause the processor to perform the above operations.

From an apparatus perspective, an apparatus is provided comprising a controller configured to generate steering matrix information for spatially precoding a first transmission to be sent via a plurality of antennas of a first base station to beamform the first transmission to one or more wireless devices served by the first base station while nulling to one or more wireless devices served by at least a second base station; and a baseband unit configured to generate a transmit waveform by applying the steering matrix information to the first transmission, the transmit waveform to be sent by the first base station simultaneously with the sending of a transmit waveform for a second transmission by the second base station via a plurality of antennas of the second base station at an agreed upon time with the second base station, the transmit waveform for the second transmission having been generated by the second base station using steering matrix information generated at the second base station to beamform the second transmission to one or more wireless devices served by the second base station while nulling the second transmission to one or more wireless devices served by the first base station.

The above description is intended by way of example only.

What is claimed is:

1. A method comprising:
   at a first base station in a wireless network:
   generating steering matrix information for spatially precoding a first transmission to be sent via a plurality of antennas of the first base station to beamform the first transmission to one or more wireless devices served by the first base station while nulling to one or more wireless devices served by at least a second base station;
   generating a transmit waveform by applying the steering matrix information to the first transmission, the transmit waveform to be sent by the first base station simultaneously with the sending of a transmit waveform for a second transmission by the second base station via a plurality of antennas of the second base station at an agreed upon time with the second base station, the transmit waveform for the second transmission having been generated by the second base station using steering matrix information generated at the second base station to beamform the second transmission to one or more wireless devices served by the second base station while nulling the second transmission to one or more wireless devices served by the first base station; and
   generating an announcement frame configured to initiate coordinated simultaneous transmissions by the first base station and one or more other base stations including the second base station, the announcement frame containing one or more first identifiers indicating one or more base stations that are solicited to participate in the coordinated simultaneous transmissions and one or more second identifiers indicating one or more wireless devices to which each base station participating in the coordinated simultaneous transmissions is to simultaneously transmit,
   wherein generating the announcement frame comprises generating information designating an order in which the one or more base stations that elect to participate in the coordinated simultaneous transmissions are to transmit a block acknowledgement request and a schedule of when to transmit the block acknowledgment request to solicit acknowledgment responses from one or more wireless devices that are intended recipients,
   wherein when one of the one or more base stations transmits a block acknowledgment request and does not receive an acknowledgment response after a predetermined time interval, further comprising a next base station that is to transmit a block acknowledgment request protecting the wireless channel to allow for a previous base station in the order of block acknowledgment requests to receive an acknowledgment response from its one or more wireless devices that are intended recipients, and
   wherein protecting the wireless channel comprises relying on protection of the wireless channel based on a network allocation vector from a first block acknowledgment request frame to be transmitted by the subset of base stations.

2. The method of claim 1, further comprising the first base station transmitting the announcement frame for reception by the one or more of base stations.

3. The method of claim 2, further comprising:
receiving at the second base station the announcement frame from the first base station;
determining whether to participate in the coordinated simultaneous transmissions; and
if it is determined to participate in the coordinated simultaneous transmissions, spatially precoding transmit data at the second base station to beamform to the one or more wireless devices served by the second base station while nulling to all other wireless devices.

4. The method of claim 3, further comprising storing at the second base station channel state information for each of the wireless devices served by the second base station and for other wireless devices based on frames sent between the other wireless devices and their respective base stations, and age information indicating when the channel state information was obtained, and wherein determining comprises determining whether to participate in the coordinated simultaneous transmissions based on the age information within a predetermined time interval after transmission of the announcement frame.

5. The method of claim 3, further comprising determining from the announcement frame an order of when the second base station is to transmit one or more block acknowledgment requests to solicit an acknowledgment response from each of the one or more wireless devices that are intended recipients of the second base station during the coordinated simultaneous transmissions.

6. The method of claim 5, further comprising detecting one or more block acknowledgement request/acknowledgment response exchanges between another base station and its wireless devices prior to the second base station transmitting a first block acknowledgment request.

7. The method of claim 5, further comprising transmitting from the second base station to the first base station a list of neighbor base stations of the second base station and wireless devices served by the neighbor base stations.

8. The method of claim 1, further comprising storing at the first base station receive spatial nulling information for a wireless device served by another base station derived from reception of a transmission made by the wireless device to the other base station;
receiving at the first base station an acknowledgment frame from the wireless device served by the other base station that at least partially overlaps in time with an acknowledgment frame from a wireless device served by the first base station; and
applying the receive spatial nulling information to null out the acknowledgment frame received from the wireless device served by the other base station.

9. The method of claim 1, further comprising storing at the first base station channel state information between the first base station and all wireless devices that are candidates for inclusion in coordinated simultaneous transmissions with one or more other base stations, the channel state information being generated from one or more of: implicit sounding by monitoring of uplink frames or request-to-send/clear-to-send exchanges and explicit sounding according to procedures of a communication protocol.

10. The method of claim 9, further comprising receiving at the first base station, from each of the one or more other base stations, a neighbor list of base stations and wireless devices; and forming a group of base stations and the wireless devices they serve based on the received neighbor lists and wireless devices that have similar downlink traffic patterns.

11. The method of claim 9, further comprising at the first base station, selecting for participation in the coordinated simultaneous transmissions, one or more wireless devices served by the first base station and one or more wireless devices served by one or more other base stations.

12. A system comprising:
a plurality of base stations each configured to wirelessly serve one or more wireless devices, wherein at least first and second base stations are configured to transmit simultaneously at an agreed upon time;
the first and second base stations each being configured to locally generate steering matrix information used to spatially precode their respective data transmissions in order to steer their respective data transmissions to their one or more wireless devices while nulling to the one or more client devices of the other base station;
the first and second base stations being configured to locally generate a transmit waveform by applying the steering matrix information to their respective data transmissions; and
the first base station being configured to generate an announcement frame configured to initiate coordinated simultaneous transmissions by the first base station and one or more other base stations including the second base station, the announcement frame containing one or more first identifiers indicating one or more base stations that are solicited to participate in the coordinated simultaneous transmissions and one or more second identifiers indicating one or more wireless devices to which each base station participating in the coordinated simultaneous transmissions is to simultaneously transmit;
wherein the first base station is configured to generate the announcement frame comprising information designating an order in which the one or more base stations that elect to participate in the coordinated simultaneous transmissions are to transmit a block acknowledgement request and a schedule of when to transmit the block acknowledgment request to solicit acknowledgment responses from one or more wireless devices that are intended recipients,
wherein when one of the one or more base stations transmits a block acknowledgment request and does not receive an acknowledgment response after a predetermined time interval, further comprising a next base station that is to transmit a block acknowledgment request protecting the wireless channel to allow for a previous base station in the order of block acknowledgment requests to receive an acknowledgment response from its one or more wireless devices that are intended recipients, and
wherein protecting the wireless channel comprises relying on protection of the wireless channel based on a network allocation vector from a first block acknowledgment request frame to be transmitted by the subset of base stations.

13. The system of claim 12, wherein the first based station is configured to:
transmit the announcement frame for reception by the one or more of base stations.

14. The system of claim 12, wherein the first base station is configured to store receive spatial nulling information for a wireless device served by another base station derived from reception of a transmission made by the wireless device of the other base station; receive at the first base station an acknowledgment frame from the wireless device served by the other base station that at least partially overlaps in time with an acknowledgment frame from a wireless device served by the first base station; and apply the receive spatial nulling information to null out the acknowledgment frame received from the wireless device served by the other base station.

15. The system of claim 12, wherein the first base station is configured to store channel state information between the first base station and all wireless devices that are candidates for inclusion in coordinated simultaneous transmissions with one or more other base stations, the channel state information being generated from one or more of: implicit sounding by monitoring of uplink frames or request-to-send/clear-to-send exchanges and explicit sounding according to procedures of a communication protocol.

16. An apparatus comprising:
a controller configured to:
generate steering matrix information for spatially precoding a first transmission to be sent via a plurality of antennas of a first base station to beamform the first transmission to one or more wireless devices served by the first base station while nulling to one or more wireless devices served by at least a second base station; and
generate an announcement frame configured to initiate coordinated simultaneous transmissions by the first base station and one or more other base stations including the second base station, the announcement frame containing one or more first identifiers indicating one or more base stations that are solicited to participate in the coordinated simultaneous transmissions and one or more second identifiers indicating one or more wireless devices to which each base station participating in the coordinated simultaneous transmissions is to simultaneously transmit,
wherein the controller is configured to generate the announcement frame comprising information designating an order in which the one or more base stations that elect to participate in the coordinated simultaneous transmissions are to transmit a block acknowledgement request and a schedule of when to transmit the block acknowledgment request to solicit acknowledgment responses from one or more wireless devices that are intended recipients,
wherein when one of the one or more base stations transmits a block acknowledgment request and does not receive an acknowledgment response after a predetermined time interval, further comprising a next base station that is to transmit a block acknowledgment request protecting the wireless channel to allow for a previous base station in the order of block acknowledgment requests to receive an acknowledgment response from its one or more wireless devices that are intended recipients, and
wherein protecting the wireless channel comprises relying on protection of the wireless channel based on a network allocation vector from a first block acknowledgment request frame to be transmitted by the subset of base stations; and
a baseband unit configured to generate a transmit waveform by applying the steering matrix information to the first transmission, the transmit waveform to be sent by the first base station simultaneously with the sending of a transmit waveform for a second transmission by the second base station via a plurality of antennas of the second base station at an agreed upon time with the second base station, the transmit waveform for the second transmission having been generated by the second base station using steering matrix information generated at the second base station to beamform the second transmission to one or more wireless devices served by the second base station while nulling the second transmission to one or more wireless devices served by the first base station.

17. The apparatus of claim 16, wherein the controller is configured to store receive spatial nulling information for a wireless device served by another base station derived from reception of a transmission made by the wireless device served by the other base station; and to supply the receive spatial nulling information to the baseband unit to cause the baseband unit to apply the receive spatial nulling information to null out an acknowledgment frame received at the first base station from the wireless device served by the other base station that at least partially overlaps in time with an acknowledgment frame from a wireless device served by the first base station.

18. The apparatus of claim 16, wherein the controller is configured to store channel state information between the first base station and all wireless devices that are candidates for inclusion in coordinated simultaneous transmissions with one or more other base stations, the channel state information being generated from one or more of: implicit sounding by monitoring of uplink frames or request-to-send/clear-to-send exchanges and explicit sounding according to procedures of a communication protocol.

19. One or more non-transitory computer readable storage media encoded with software comprising computer executable instructions and when the software is executed operable to:
generate steering matrix information for spatially precoding a first transmission to be sent via a plurality of antennas of a first base station to beamform the first transmission to one or more wireless devices served by the first base station while nulling to one or more wireless devices served by at least a second base station;
generate a transmit waveform by applying the steering matrix information to the first transmission, the transmit waveform to be sent by the first base station simultaneously with the sending of a transmit waveform for a second transmission by the second base station via a plurality of antennas of the second base station at an agreed upon time with the second base station, the transmit waveform for the second transmission having been generated by the second base station using steering matrix information generated at the second base station to beamform the second transmission to one or more wireless devices served by the second base station while nulling the second transmission to one or more wireless devices served by the first base station; and
generate an announcement frame configured to initiate coordinated simultaneous transmissions by the first base station and one or more other base stations including the second base station, the announcement frame containing one or more first identifiers indicating one or more base stations that are solicited to participate in the coordinated simultaneous transmissions and one or more second identifiers indicating one or more wireless devices to which each base station participating in the coordinated simultaneous transmissions is to simultaneously transmit,
wherein the instructions operable to generate the announcement frame comprise instructions operable to generate the announcement frame comprising information designating an order in which the one or more base stations that elect to participate in the coordinated simultaneous transmissions are to transmit a block acknowledgement request and a schedule of when to transmit the block acknowledgment request to solicit acknowledgment responses from one or more wireless devices that are intended recipients, wherein when one of the one or more base stations transmits a block acknowledgment request and does not receive an acknowledgment response after a predetermined time interval, further comprising a next base station that is to transmit a block acknowledgment request protecting the wireless channel to allow for a previous base station in the order of block acknowledgment requests to receive an acknowledgment response from its one or more wireless devices that are intended recipients, and wherein protecting the wireless channel comprises relying on protection of the wireless channel based on a network allocation vector from a first block acknowledgment request frame to be transmitted by the subset of base stations.

20. The non-transitory computer readable storage media of claim 19, further comprising instructions operable to store receive spatial nulling information for a wireless device served by another base station derived from reception of a transmission made by the wireless device served by the other base station; and to apply the receive spatial nulling information to null out an acknowledgment frame received at the first base station from the wireless device served by the other base station that at least partially overlaps in time with an acknowledgment frame from a wireless device served by the first base station.

* * * * *

UNITED STATES PATENT AND TRADEMARK OFFICE
CERTIFICATE OF CORRECTION

PATENT NO.        : 9,241,275 B2  
APPLICATION NO.   : 13/780513  
DATED             : January 19, 2016  
INVENTOR(S)       : Kloper et al.

Page 1 of 1

It is certified that error appears in the above-identified patent and that said Letters Patent is hereby corrected as shown below:

On the Title page

Item (73) Assignee:, replace "Cisco Technologies, Inc." with -- Cisco Technology, Inc. --.

In the Claims

Column 14, Claim 1, Line 49, change "acknowledgement" to -- acknowledgment --.

Signed and Sealed this  
Twenty-sixth Day of April, 2016

Michelle K. Lee  
*Director of the United States Patent and Trademark Office*